United States Patent [19]
Price et al.

[11] Patent Number: 5,826,325
[45] Date of Patent: Oct. 27, 1998

[54] METHOD OF MERGING HEADS

[75] Inventors: Kirk B. Price; Brad J. Kriehn, both of San Jose; Roy J. Flowers, Gilroy; Brad V. Johnson, Santa Clara, all of Calif.; Eric Eckberg, Rochester, Minn.

[73] Assignee: International Business Machines Corporation, Armonk, N.Y.

[21] Appl. No.: 890,897

[22] Filed: Jul. 10, 1997

[51] Int. Cl.$^6$ ........................................ G11B 5/42
[52] U.S. Cl. .................. 29/603.03; 29/737; 360/98.01
[58] Field of Search .................. 29/603.03, 737, 29/759, 760; 360/98.01, 105

[56] References Cited

U.S. PATENT DOCUMENTS

| | | |
|---|---|---|
| 3,984,873 | 10/1976 | Pejcha . |
| 4,005,485 | 1/1977 | Opocensky . |
| 4,571,648 | 2/1986 | Barski . |
| 4,644,429 | 2/1987 | Boe . |
| 4,787,000 | 11/1988 | Schulze . |
| 4,851,943 | 7/1989 | Perry . |
| 4,862,584 | 9/1989 | Budy et al. . |
| 5,150,512 | 9/1992 | Hatchett et al. . |
| 5,241,438 | 8/1993 | Matsushima . |
| 5,303,096 | 4/1994 | Keller . |
| 5,404,636 | 4/1995 | Stefansky et al. . |
| 5,465,476 | 11/1995 | Krajec et al. . |
| 5,471,733 | 12/1995 | Bernett et al. . |

FOREIGN PATENT DOCUMENTS

| | | |
|---|---|---|
| 63-167489A | 7/1988 | Japan . |
| 2-66784A | 3/1990 | Japan . |
| 2196924 | 5/1988 | United Kingdom . |

OTHER PUBLICATIONS

IBM Technical Disclosure Bulletin, vol. 30 No. 2; Jul. 1987.
IBM Technical Disclosure Bulletin, vol. 33 No. 6A; Nov. 1990.
EBM Technical Disclosure bulletin, vol. 38 No. 03; Mar. 1995.

*Primary Examiner*—Carl E. Hall
*Attorney, Agent, or Firm*—Noreen A. Krall; James E. Bradley; Andrew J. Dillon

[57] ABSTRACT

A head disk assembly file has a tub-type basecasting with side walls, a floor and a pack of hard disks. The file also comprises an actuator having a set of head gimbal assemblies with magnetic heads. The actuator is secured to the file and is rotatable from a pre-merge position outside of the disks to an inner diameter position near the centers of the disks. A head merge tool comprising a merge comb with fingers interfaces with the file at a home position. In the home position, the merge comb is surrounded by but free of contact with the side walls, the floor and the head gimbal assemblies. The floor has a recess located beneath the merge comb. The recess extends from one side wall to the inner diameter of the disks and provides a clearance for a lowermost finger of the merge comb. A flexible cable extends from the actuator to the floor. A depression in the floor adjacent to the recess accommodates the flexible cable. The depression is located beneath the path of and free of contact with the merge comb and actuator. During assembly, the merge comb is placed in the file at the home position and rotated so that the fingers engage and move the head gimbal assemblies to merge the heads. The lowermost finger moves beneath the lowermost disk in the recess free of contact with the lowermost disk and a floor surface of the recess. The merge comb then returns to the home position and disengages the file.

10 Claims, 3 Drawing Sheets

METHOD OF MERGING HEADS

BACKGROUND OF THE INVENTION

1. Technical Field

This invention relates in general to the design and manufacture of hard disk drives and in particular to an improved hard disk design that allows the use of an improved head merge process for hard disk drives with tub basecastings.

2. Description of the Related Art

During the assembly of a hard disk drive (HDD), the placement of the magnetic read-write heads on the disk is typically the most critical operation. The tool used to do this operation is called the head merge tool (HMT). There are several types of prior art HMTs, each of which has its disadvantages.

An outer diameter (OD) static merge HMT places the heads at the OD of the stationary disk and the HMT is removed. The spindle motor and the actuator are subsequently powered up and the actuator moves the heads to the park position at the inner diameter (ID) of the disks. The second type of prior art tool is related to the first and is known as the OD dynamics HMT. This tool places the heads at the OD of the spinning disks. The actuator is subsequently powered up to move the heads to the ID park position. These first two tools require the spindle and actuator to be powered, and the application of power to be correctly sequenced. These requirements increase the complexity of these HMTs. In addition, the OD static merge tool requires a special data zone head-disk interface so that the heads do not instantly stick to the stationary disks. This requirement is contrary to the desire for a super-smooth interface for low fly height and high areal density.

Space merge HMTs are the third type of prior art tool. This tool positions the actuator and the disk pack outside the file by using a tooling plate and places the heads at the ID of the stationary disks. The base plate is subsequently installed over the voice coil motor, actuator and disk pack. Space merge HMTs require a complex tool to hold the disk pack and the actuator in the correct positions and to correctly place the basecasting over the merged HSA-disk pack assembly. The added complexity of this process increases the cycle time required by the tool. Consequently, multiple stations are required in an HDD assembly line to balance the operation times.

The final prior art tool is known as ID static merge. This HMT uses a merge comb with long fingers that can place the heads at the ID of the stationary disks. This is a relatively simple tool that requires no automation or power for the spindle motor or the actuator. There is low work content required at the tool, so it is easier to balance cycle times between various stations. However, severe constraints are placed on the geometry of the basecasting to accommodate the long fingers of the merge comb. Because of this requirement, this tool has been limited to use with "clamshell" and "flatplate" "deep cover" type basecastings.

Tub-type basecastings have advantages over other designs in terms of cost, sealing and dynamics. These features have made it the dominant choice in high end HDDs. However, the limited space in the tub design has preempted the use of ID static HMTs. An ID static merge tool that can be used with tub-type basecastings is desirable.

DISCLOSURE OF INVENTION

A head disk assembly file has a tub-type basecasting with side walls and a floor. A pack of magnetic hard disks are located on one end of the file. The file also comprises an actuator having a set of head gimbal assemblies with magnetic read/write heads. The actuator is secured to the file via a pivot assembly and is rotatable from a pre-merge position outside of the disks to an inner diameter position near the centers of the disks.

A head merge tool comprising a merge comb, a supporting pivot and a support structure to rigidly connect the pivot to the hard disk drive. The merge comb interfaces with the file at a home position. In the home position, the merge comb is surrounded by but free of contact with the side walls, the floor and the head gimbal assemblies. The floor has a recessed area located beneath a rotational path of the merge comb. The recess extends from one side wall to the inner diameter of the disks. The recess provides a clearance for a lowermost finger of the merge comb. A flexible cable extends from the actuator to a vertical wall of a bracket which is attached to the floor of the basecasting. A depression in the floor adjacent to the recess accommodates the bracket holding the flexible cable. The depression is located beneath the rotational path of and free of contact with the merge comb and actuator.

During assembly, the merge comb is placed in the file at the home position and is free to rotate relative to the actuator. The merge comb is rotated so that the fingers engage and move the head gimbal assemblies to the ID of the disks where the heads are over a landing zone on the disks. The lowermost finger moves beneath the lowermost disk in the recess free of contact with the lowermost disk and a floor surface of the recess. The merge comb then returns to the home position. As it does so the heads are deposited on the landing zone. The merge comb can be removed from the file once it reaches the home position.

BEST MODE FOR CARRYING OUT THE INVENTION

Figure 1:
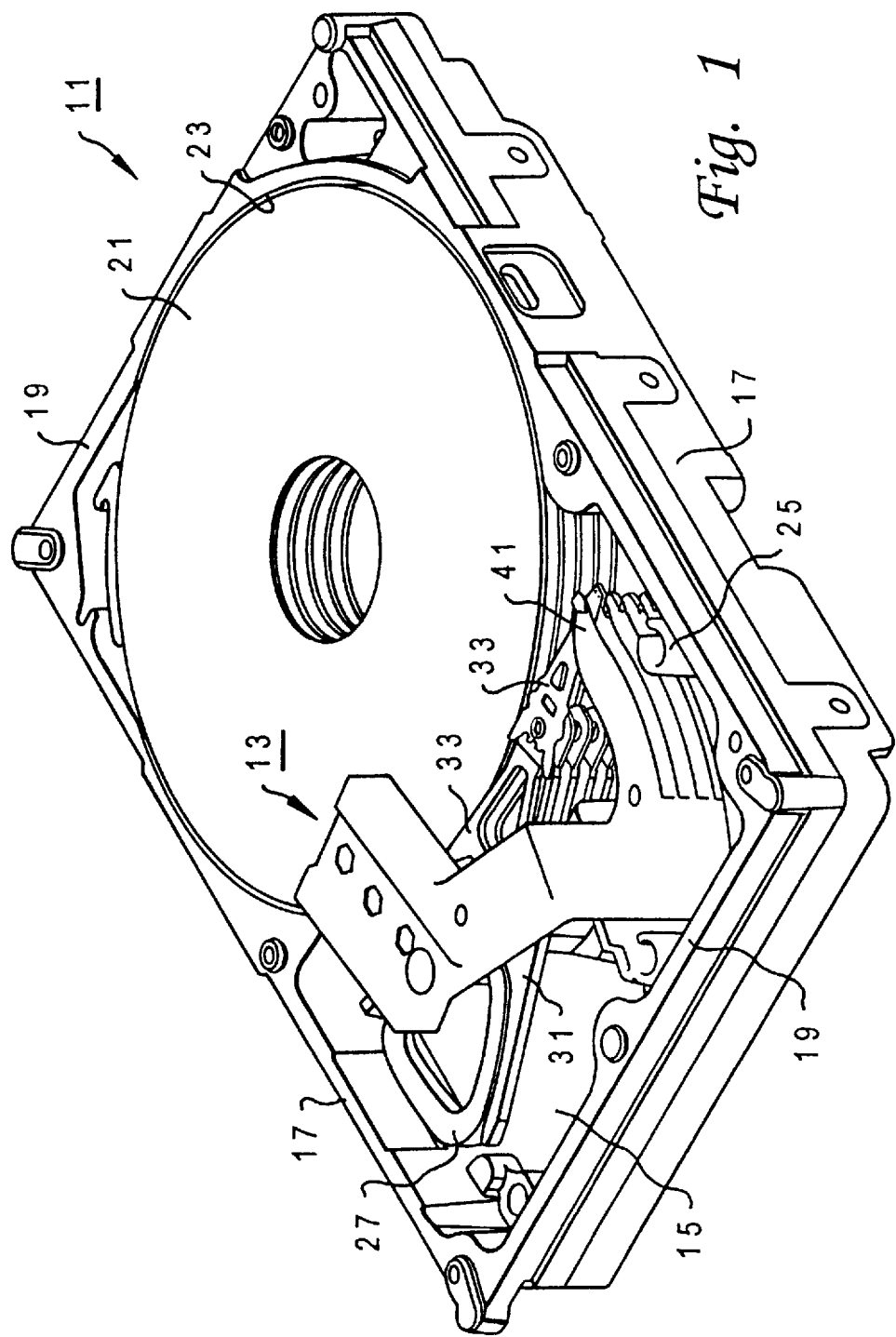
FIG. 1 is an isometric view of a head disk assembly and head merge tool constructed in accordance with the invention.
Figure 2:
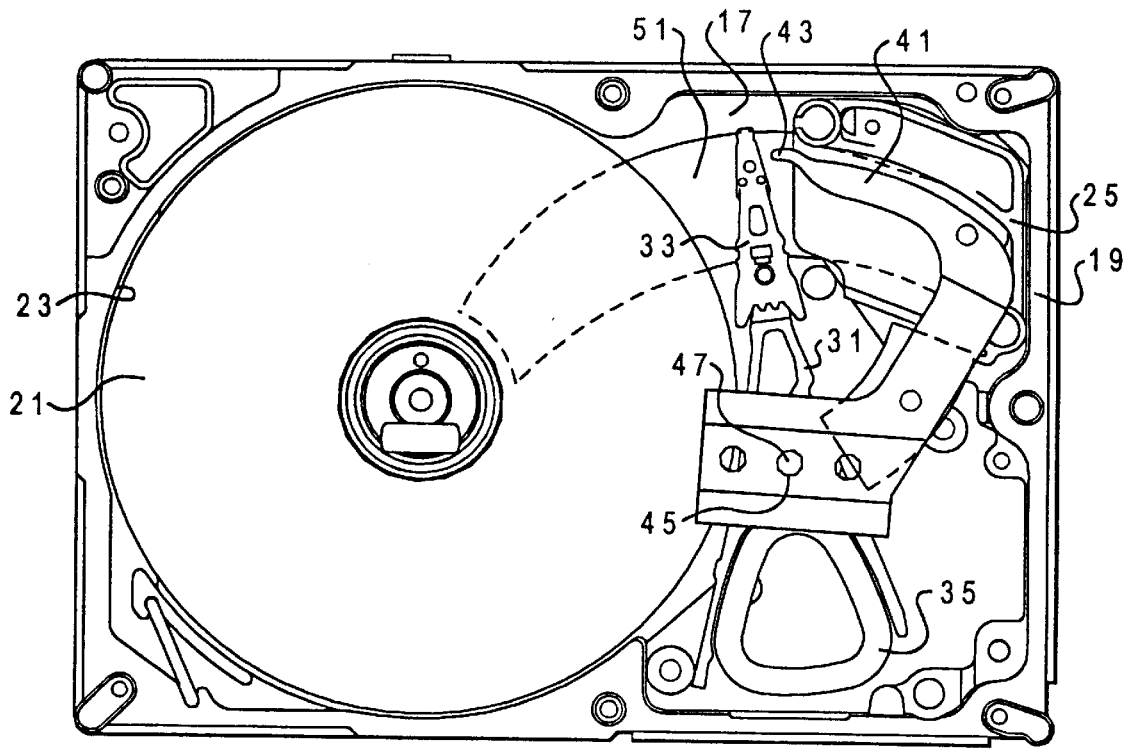
FIG. 2 is a plan view of the head disk assembly of FIG. 1 with the merge comb in a fully retracted position.
Figure 4:
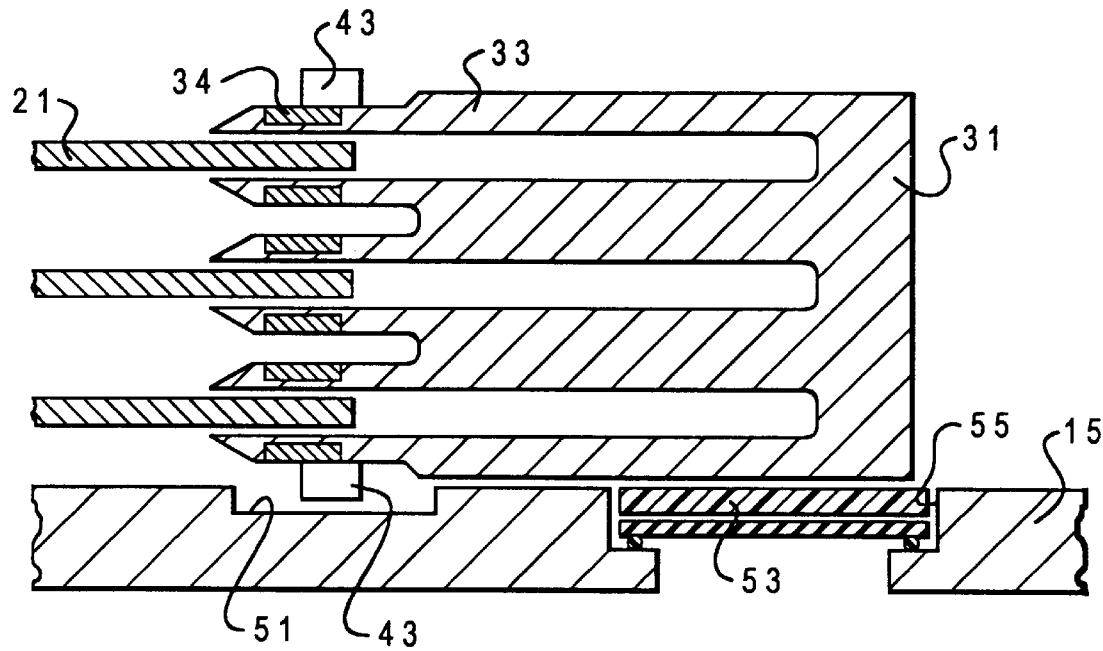
FIG. 4 is a sectional side view of the head disk assembly of FIG. 1 taken along the line 4—4 of FIG. 3 with the merge comb located at an intermediate, outer diameter position.

Referring to FIGS. 1 and 2, a head disk assembly file 11 is shown with a head merge tool 13. File 11 has a shallow rectangular tub-type basecasting 15 with longitudinal side walls 17 and lateral side walls 19. A plurality of thin, circular, magnetic hard disks 21 are located in a semi-circular opening 23 on one end of file 11. Disks 21 are axially aligned vertically and are slightly spaced apart from one another to form a stack. A flexible cable bracket 25 is located in an upper right corner of tub 15 (FIG. 2). File 11 also comprises an actuator 31 having a plurality of triangular head gimbal assemblies 33 swaged thereto. Each head gimbal assembly 33 comprises a thin sheet metal load beam with a magnetic read/write head 34 on a distal end which must be placed or "parked" on one of disks 21 (FIG. 4).

Figure 3:
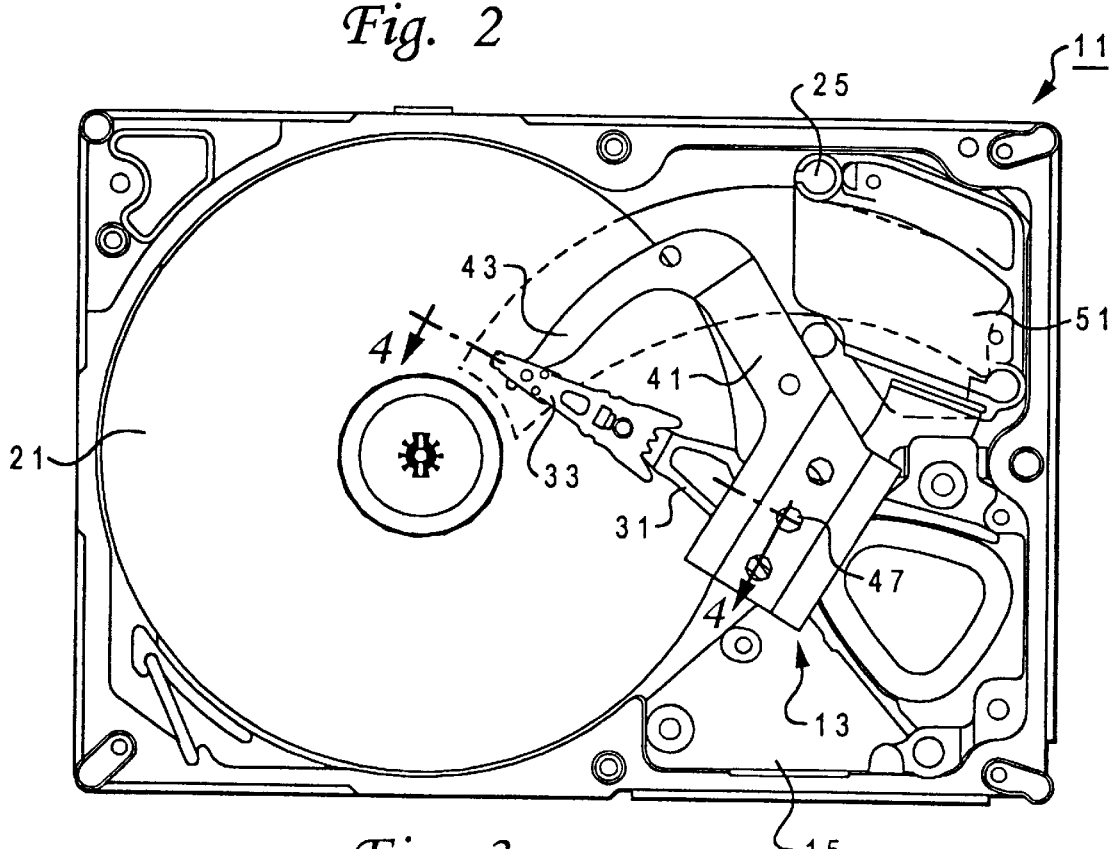
FIG. 3 is a plan view of the head disk assembly of FIG. 1 with the merge comb at a fully extended, inner diameter position.
Figure 5:
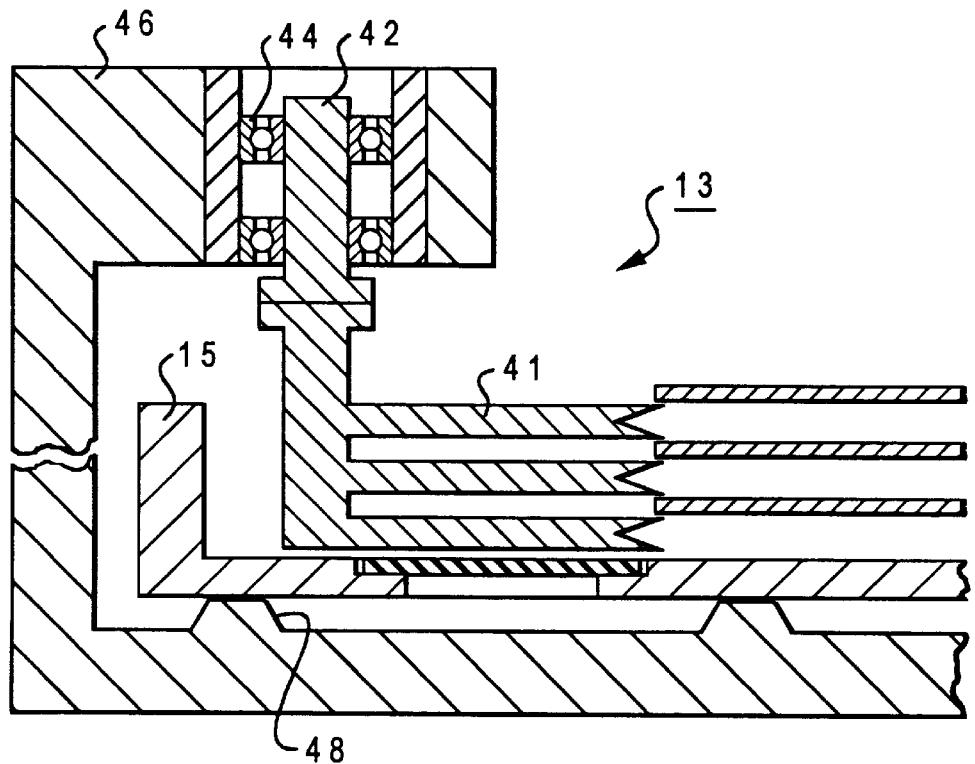
FIG. 5 is a sectional front view of the head disk assembly of FIG. 1 and a merge tool for manipulating the merge comb.

Head gimbal assemblies 33 allow the heads to freely follow any axial motion of the respective disks 21. A voice coil motor 35 comprising a plurality of magnets attached to a back iron assembly is located in a lower left corner of tub 15. Voice coil motor 35 is used to move actuator 31 once file 11 is installed in a computer (not shown). Actuator 31 is rotatable about a central pivot portion (not shown) which is secured to tub 15. Actuator 31 has a range of rotation extending from a pre-merge position outside of disks 21 (FIGS. 1 and 2) to an inner diameter position near the centers of disks 21 (FIG. 3). As shown in FIG. 5, merge tool 13 is aligned and secured to file 11 with a set of precision tooling points 48 which bear on specified locations on tub 15 so that the plane of disks 21 and the locations of actuator 31 are precisely located.

Merge tool 13 comprises a merge comb 41, a shaft 42, a set of bearings 44 that are held by a support structure 46 for inserting merge comb 41 into file 11. Merge comb 41 is C-shaped and has a plurality of fingers 43. When merge comb 41 is inserted into file 11, it is joined to actuator 31 at a starting or home position (FIG. 2). Support structure 46 is rigidly connected to base 15 by tooling points 48. The axis of rotation of bearings 44 is coaxial with an actuator pivot (not shown). A pin 47 is perpendicular to file 11 and is used to lock actuator 31 and merge comb 41 for rotation together. In the home position, merge comb 41 is surrounded by but free of contact with side walls 17, 19, the floor of tub 15, flexible cable bracket 25 and head gimbal assemblies 33.

Tub 15 has a recessed area 51 located beneath a rotational path of merge comb 41 in the floor of tub 15. Recess 51 extends in an arcuate path from side wall 19 through flexible cable bracket 25 to a position below the inner diameters of disks 21. Recess 51 is provided as a clearance for a lowermost finger 43 of merge comb 41. An electrical flexible cable 53 extends from actuator 31 to flexible cable bracket 25. A depression 55 adjacent to recess 51 accommodates a lower portion of flexible cable 53. Depression 55 is located in the floor of tub 15 beneath a portion of the rotational path of merge comb 41, actuator 31 and flexible cable bracket 25. Merge comb 41 and actuator 31 are free of contact with the lower portion of flexible cable 53 throughout a complete range of motion of merge comb 41.

In operation, files 11 are individually presented during assembly to a head merge station (not shown). If the assembly of files 11 is automated, each file 11 is lifted into position so that merge comb 41 is placed in the starting or home position (FIG. 2). This operation may be performed by an automatic sequencing of air cylinders and stepper motors or manually by an operator. Merge comb 41 is engaged to file 11 so that it is secured from axial movement but is free to rotate relative to actuator 31. At this point actuator 31 is in a pre-merge position outside of the stack of disks 21 and merge comb 43 is free of contact with base 15, side walls 17, 19 and head gimbal assemblies 33. Merge comb 41 is rotated counterclockwise relative to actuator 31 and file 11 so that fingers 43 contact and engage distal portions of head gimbal assemblies 33 (FIG. 1). Pin 47 is then inserted through opening 45 so that merge comb 41 will not disengage actuator 31. A shipping clip (not shown) which was used to protect heads 34 is removed. Merge comb 41 is further rotated, causing the lowermost finger 43 of merge comb 41 to move beneath a lowermost disk 21 and above the floor of tub 15 free of contact with lowermost disk 21 and a floor surface of recess 51. Merge comb 41 rotates the head gimbal assemblies 33 approximately thirty degrees to a position between the disks 21 (FIG. 4). When the heads of head gimbal assemblies 33 reach a landing zone at the inner diameters of disks 21, actuator 31 is captured with a conventional home latch (not shown) to secure actuator 31 from further movement (FIG. 3). Merge comb 41 is then rotated clockwise to the home position after the removal of pin 47. Fingers 43 are now free of contact with file 11 and are removed from file 11 by relative movement of support structure 46. At the next station of the assembly, the outer diameter crash stop is installed so that actuator 31 can no longer be rotated past an outer diameter position of the heads.

The invention has several advantages. A tub-type base-casting is provided for use with an ID static head merge tool which has a merge comb with long fingers. The merge comb may be completely contained with the sidewalls of the tub. There is low work content required at the tool, so it is easier to balance cycle times between various stations. This base-casting has lower cost and better sealing and dynamics. The merge tool operates without requiring any electrical connection to the file, thereby simplifying the merge operation.

While the invention has been shown in only one of its forms, it should be apparent to those skilled in the art that it is not so limited, but is susceptible to various changes without departing from the scope of the invention.

We claim:

1. A method for merging heads on an actuator onto the disks of a hard disk drive file having a home latch, a flexible cable and a tub-type base with side walls and a floor, comprising:

(a) inserting a head merge tool having a merge comb with fingers into the base at a home position wherein the merge comb is free of contact with the actuator, side walls and floor;

(b) engaging the head merge tool to the file so that the merge comb is secured from axial movement and is free to rotate relative to the actuator;

(c) rotating the merge comb relative to the actuator so that the fingers contact and engage the actuator;

(d) further rotating the merge comb until the actuator is positioned at an inner diameter of the disks wherein a lowermost finger of the merge comb is located below a lowermost disk and above the floor of the base;

(e) capturing the actuator with the home latch to secure the actuator from movement;

(f) retracting the merge comb to the home position;

(g) disengaging the head merge tool from the file; and then (h) removing the merge comb from the file.

2. The method of claim 1 wherein step (c) further comprises inserting a pin into the merge comb and the actuator; and wherein step (e) further comprises removing the pin.

3. The method of claim 1 wherein step (a) comprises surrounding the merge comb with the side walls.

4. The method of claim 1, further comprising providing a depression in the floor of the base beneath a rotational path of the merge comb and the actuator for accommodating a portion of the flexible cable so that the merge comb and the actuator are free of contact with the portion of the flexible cable.

5. The method of claim 1, further comprising providing a recess in the floor of the base beneath a rotational path of the merge comb for accommodating the lowermost finger of the merge comb, the recess allowing the lowermost finger to move between the home position and the inner diameter of the disks free of contact with the lowermost disk and a floor surface of the recess.

6. The method of claim 5, wherein the step of providing a recess comprises extending the recess from one of the side walls to the inner diameter of the disks.

7. A method for merging magnetic read/write heads onto the disks of a hard disk drive file, comprising:
   (a) providing the file with an actuator, a home latch, a flexible cable, and a tub-type base with side walls and a floor;
   (b) inserting a head merge tool having a merge comb with fingers into the base at a home position wherein the merge comb is surrounded by the side walls and is free of contact with the actuator, side walls and floor, the merge comb being located above a recess in the floor of the base beneath a rotational path of the merge comb;
   (c) engaging the head merge tool to the file so that the merge comb is secured from axial movement and is free to rotate relative to the actuator;
   (d) rotating the merge comb relative to the actuator so that tips of the fingers contact and engage the actuator;
   (e) further rotating the merge comb, causing a lowermost finger of the merge comb to move beneath a lowermost disk and above the floor of the base free of contact with the lowermost disk and a floor surface of the recess;
   (f) capturing the actuator with the home latch to secure the actuator from movement;
   (g) retracting the merge comb to the home position;
   (h) disengaging the head merge tool from the file; and then
   (i) removing the merge comb from the file.

8. The method of claim 7 wherein step (d) further comprises inserting a pin into the merge comb and actuator; and wherein step (f) further comprises removing the pin.

9. The method of claim 7, wherein step (a) comprises extending the recess in an arcuate path from one of the side walls to the inner diameter of the disks.

10. The method of claim 7, further comprising providing a depression in the floor of the base adjacent to the recess and beneath a rotational path of the merge comb and the actuator for accommodating a portion of the flexible cable so that the merge comb and the actuator are free of contact with the portion of the flexible cable.

* * * * *